United States Patent [19]

Amako et al.

[11] Patent Number: 5,589,955
[45] Date of Patent: Dec. 31, 1996

[54] OPTICAL DEVICE AND OPTICAL MACHINING SYSTEM USING THE OPTICAL DEVICE

[75] Inventors: Jun Amako; Hirotsuna Miura; Tomio Sonehara, all of Suwa, Japan

[73] Assignee: Seiko Epson Corporation, Tokyo, Japan

[21] Appl. No.: 33,217

[22] Filed: Mar. 18, 1993

Related U.S. Application Data

[63] Continuation of Ser. No. 965,276, Jan. 21, 1993, abandoned.

[30] Foreign Application Priority Data

| May 21, 1991 | [JP] | Japan | 3-116058 |
| May 24, 1991 | [JP] | Japan | 3-120383 |
| May 7, 1992 | [JP] | Japan | 4-114479 |
| May 14, 1992 | [JP] | Japan | 4-122136 |

[51] Int. Cl.$^6$ ............................. G03H 1/08
[52] U.S. Cl. .................. 359/9; 359/10; 359/24; 359/29
[58] Field of Search .................. 359/10, 11, 21, 359/29, 559, 560, 9, 24, 35

[56] References Cited

U.S. PATENT DOCUMENTS

| 3,819,248 | 6/1974 | Takeda et al. ............................. 359/21 |
| 3,891,976 | 6/1975 | Carlsen ...................................... 359/21 |
| 4,370,024 | 1/1983 | Task et al. ................................ 359/562 |

(List continued on next page.)

FOREIGN PATENT DOCUMENTS

| 58-118860 | 7/1983 | Japan . |
| 59-50480 | 3/1984 | Japan . |
| 60-11872 | 1/1985 | Japan . |
| 60-174671 | 9/1985 | Japan . |
| 62-65072 | 3/1987 | Japan . |

(List continued on next page.)

OTHER PUBLICATIONS

*IBM Journal of Research & Development*, vol. 13, pp. 150–155 (1969), L. B. Lesem et al., "The Kinoform: A New Reconstruction Device".

*Optical Engineering*, vol. 19 No. 3, pp. 297–305 (1980), J. R. Fienup, "Iterative Method Applied to Image Reconstruction and to Computer–Generated Holograms".

*Kogaku*, Japanese Journal of Optics, vol. 21, pp. 155–156 (1992), Amako et al., "Recording and Reproduction of Kinoform by Using Liquid Crystal Spatial Light Modulator".

*51st Lectures on Applied Physics*, 26a–H–10 (1990), Amako et al., "Kinoform Using Liquid Crystal Spatial Light Modulator".

*Science*, vol. 220, pp. 671–680 (1983), Kirkpatrick et al., "Optimization by Simulated Annealing".

*52nd Lectures on Applied Physics*, 10a–ZK–2 (1991), Amako et al., "Wavefront Control Using Liquid Crystal Spatial Light Modulators".

*Applied Optics*, vol. 12, No. 10, Oct. 1973, New York US pp. 2328–2335, *Method for Computing Kinoforms that Reduce Image Reconstruction Error* by N. C. Gallagher and B. Liu.

Primary Examiner—Georgia Y. Epps
Assistant Examiner—Jordan M. Schwartz

[57] ABSTRACT

The invention provides an optical device with high light utilization efficiency that is capable of scribing patterns on curved surfaces, as well as flat surfaces, using a liquid crystal spatial light modulator. The invention offers an optical device with high light utilization efficiency and that is capable of three-dimensional formation of curved surfaces using a liquid crystal spatial light modulator. Additionally, the invention offers a widely applicable optical processing system that mounts these optical devices on robots. The invention includes at least a coherent light source, a liquid crystal spatial light modulator for controlling the wavefront of the light from the coherent light source, and a means that records the complex amplitude distribution on the liquid crystal spatial light modulator.

11 Claims, 12 Drawing Sheets

U.S. PATENT DOCUMENTS

| | | | |
|---|---|---|---|
| 4,586,053 | 4/1986 | Hughes | 347/256 |
| 4,734,558 | 3/1988 | Nakano et al. | 219/121.73 |
| 4,818,835 | 4/1989 | Kuwabara et al. | 219/121.6 |
| 4,937,424 | 6/1990 | Yasui et al. | 219/121.6 |
| 4,949,389 | 8/1990 | Allebach et al. | 359/29 |
| 4,961,615 | 10/1990 | Owechko et al. | 359/29 |
| 5,119,214 | 6/1992 | Nishi et al. | 359/21 |
| 5,121,228 | 6/1992 | Paek | 359/21 |
| 5,132,813 | 6/1992 | Caulfield et al. | 359/21 |
| 5,159,474 | 10/1992 | Franke et al. | 359/29 |
| 5,194,971 | 3/1993 | Haines | 359/9 |
| 5,438,440 | 8/1995 | Paek et al. | 359/29 |

FOREIGN PATENT DOCUMENTS

| | | | |
|---|---|---|---|
| 62-127710 | 6/1987 | Japan . | |
| 1157791 | 6/1989 | Japan . | |
| 1176564 | 7/1989 | Japan . | |
| 1176563 | 7/1989 | Japan . | |
| 1216851 | 8/1989 | Japan . | |
| 1257821 | 10/1989 | Japan . | |
| 220823 | 1/1990 | Japan . | |
| 2-132412 | 5/1990 | Japan | 359/29 |
| 318491 | 1/1991 | Japan . | |
| 3-21914 | 1/1991 | Japan | 359/29 |
| 3-257419 | 11/1991 | Japan | 359/29 |
| 5-46062 | 2/1993 | Japan | 359/29 |

EPSON ← SCRIBED CHARACTERS

EPSON ← SCRIBED CHARACTERS

OPTICAL DEVICE AND OPTICAL MACHINING SYSTEM USING THE OPTICAL DEVICE

This is a continuation, of application Ser. No. 07/965,276 filed on Jan. 21, 1993 now abandoned.

BACKGROUND OF THE INVENTION

The invention relates to (1) an optical device for pattern reproduction that combines a coherent light source with a spatial light modulator, and (2) an optical processing system that incorporates this optical device.

The prior art technology is explained by relenting to pattern scribing technology that utilizes light.

Prior art pattern scribing devices (laser scribing devices) that utilize light used methods that are generally divided into the following two methods.

(1) Laser beam scanning method
(2) Mask method

In method (1), scribing was performed on the material by scanning the laser beam two dimensionally according to a pattern using a galvanomirror or a polygon mirror (Japanese Laid-Open Patent Publication 56-118860).

In method (2), scribing was performed by irradiating a laser beam on a mask on which the pattern to be scribed was formed as openings and by projecting the pattern reduced on the material via an imaging lens. Initially, metal plates on which the openings were formed were used as the mask medium. However, due to the cost and trouble of producing the mask, liquid crystal spatial light modulators have received attention in recent years for use as variable masks.

In the method that uses a liquid crystal spatial light modulator as a variable mask, the two-dimensional optical switching effect of the liquid crystal spatial light modulator is utilized to record the pattern as is as a density. FIG. 20 shows a prior art laser scribing device. The light emitted from a laser source 2001 illuminates a twisted nematic (TN)-mode liquid crystal spatial light modulator 2004 on which the density mask of the pattern has been recorded. The transmitted light is converged by a lens 2005 to image the pattern on the surface of a material 106. Those parts of the material surface on which the pattern is imaged are evaporated by the heat of the laser, whereby the pattern is scribed. A (1) TN (twisted nematic)-mode (Japanese Laid-Open Patent Publications 60-174671, 1-176563, 1-176564 and 1-216851) or (2) scattering-mode (Japanese Laid-Open Patent Publications 1-1577912 and 3-18491) is used as the liquid crystal spatial light modulator.

In addition to these, there have been applications of the laser scribing devices that use a liquid crystal spatial light modulator as an open mask. Those that have been searched so far are listed below.

Japanese Laid-Open Patent Publications 62-127710 and 1-257821

U.S. Pat. Nos. 4,586,053, 4,734,558, 4,818,835 and 4,937,424

However, since prior art laser scribing devices used the variable pattern displayed on the liquid crystal spatial light modulator as a mask, their light utilization efficiency was low. Therefore, when the pattern to be scribed had a small total surface area such as that of short character strings or line images, a high-output laser source (or light excitation source) was required, which markedly lowered production efficiency. Also, in order to scribe a pattern on a curved surface, it was necessary to move the lens, mirror and other optical elements at high speed in the direction of depth, thus greatly complicating the device configtrration.

The invention is intended to solve these problems. The invention (1) offers an optical device with high light utilization efficiency that is capable of scribing patterns on curved surfaces by a simple means, (2) offers an optical device with high light utilization efficiency that is capable of three-dimensional formation on curved surfaces, and (3) offers a widely applicable optical processing system that incorporates these devices on robots.

SUMMARY OF THE INVENTION

The first optical device of the invention comprises at least a coherent light source, a spatial light modulator for controlling the wavefront of the light from the coherent light source, and a means that records the complex amplitude distribution on the spatial light modulator.

The second optical device of the invention is the first optical device wherein the complex amplitude distribution is a phase distribution.

The third optical device of the invention is the first or second optical device equipped with an optical system for guiding the light from the coherent light source to the spatial light modulator and an optical system for guiding the light from the spatial light modulator to where the pattern is to be reproduced.

The fourth optical device of the invention is any of the first to the third optical devices wherein the data input to the spatial light modulator is prepared based on the complex amplitude distribution corresponding to the diffraction image of the pattern to be reproduced.

The fifth optical device of the invention is any of the first to the fourth optical devices provided with a means that stores the data input to the spatial light modulator.

The sixth optical device of the invention is any of the first to the fifth optical devices wherein the means that prepares the data input to the spatial light modulator is equipped with at least a means for Fourier transformation.

The seventh optical device of the invention is any of the first to the sixth optical devices wherein the means that prepares the data input to the spatial light modulator is equipped with at least a means for performing inverse tangent operations.

The eighth optical device of the invention is any of the first to the seventh optical devices wherein the means that prepares the data input to the spatial light modulator is equipped with at least a means for generating random numbers.

The ninth optical device of the invention is any of the first to the eighth optical devices wherein the means that prepares the data input to the spatial light modulator is equipped with at least a means for generating the lens phase distribution.

The tenth optical device of the invention is any of the first to the ninth optical devices provided with a means that changes the output of the coherent light source nearly proportionally to the area of the pattern to be reproduced (that part where the intensity is not zero).

The eleventh optical device of the invention is any of the first to the tenth optical devices provided with a means for correcting wavefront aberrations of the light from the coherent light source.

The twelfth optical device of the invention is any of the first to the eleventh optical devices wherein a light-guide member is provided between the spatial light modulator and the material.

The thirteenth optical device of the invention is any of the first to the twelfth optical devices wherein a Fourier transformation lens is provided between the spatial light modulator and where the pattern is to be reproduced.

The fourteenth optical device of the invention is any of the first to the thirteenth optical devices wherein a dual-diffraction optical system comprising a Fourier transformation lens and an auxiliary lens is provided between the spatial light modulator and where the pattern is to be reproduced. Further, a spatial filter is provided between the Fourier transformation lens and the auxiliary lens.

The fifteenth optical device of the invention is any of the first to the fourteenth optical devices provided with an auxiliary lens and a drive means.

The sixteenth optical device of the invention is any of the first to the fifteenth optical devices wherein the spatial light modulator is a phase modulation type.

The seventeenth optical device of the invention is any of the first to the fifteenth optical devices wherein the spatial light modulator is an amplitude-phase modulation type.

The eighteenth optical device of the invention is any of the first to the seventeenth optical devices wherein the spatial light modulator is a liquid crystal spatial light modulator.

The nineteenth optical device of the invention is the eighteenth optical device wherein the liquid crystal spatial light modulator comprises two phase modulation-type liquid crystal spatial light modulators disposed forward and back such that their respective corresponding pixels properly face each other.

The twentieth optical device of the invention is the eighteenth optical device provided with two light paths whose polarization directions are perpendicular to each other. Further, a liquid crystal spatial light modulator is disposed in each of the light paths.

The twenty-first optical device of the invention is any of the first to the twentieth optical devices wherein the liquid crystal spatial light modulator uses an active matrix drive system.

The twenty-second optical device of the invention is any of the first to the twenty-first optical devices provided with a means that measures the surface shape of the material to be scribed.

The twenty-third optical device of the invention is any of the first to the twenty-second optical devices and a robot on which the optical devices are mounted.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 2(A) and 3(B) shows the patterns scribed on the material;

FIG. 4 shows the light modulation characteristics of the liquid crystal spatial light modulator;

DESCRIPTION OF THE PREFERRED EMBODIMENTS

First Embodiment

Figure 1:
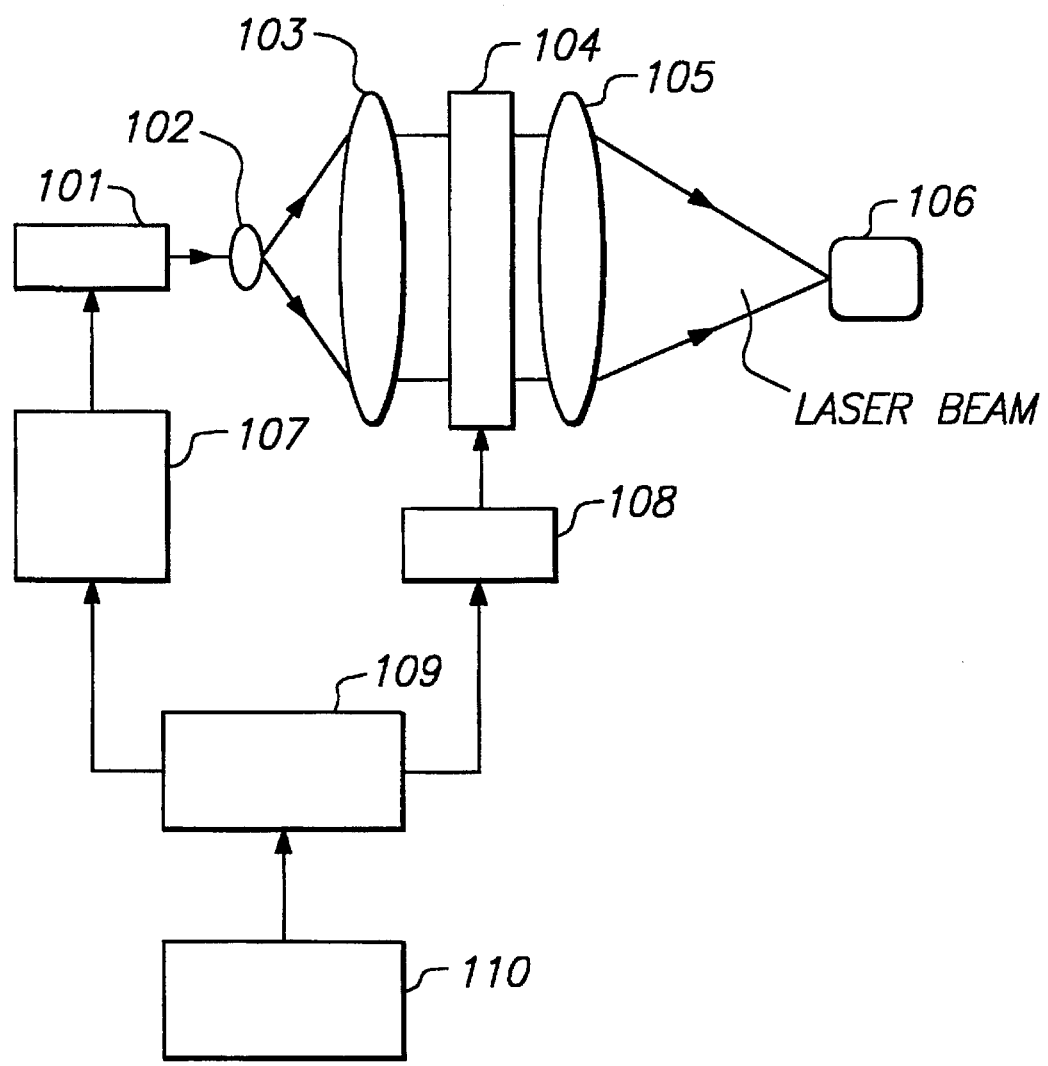
FIG. 1 shows the laser scribing device of the first embodiment.

FIG. 1 shows the configuration of a laser scribing device that utilizes the optical device of the invention. A beam emitted from laser source 101 is expanded into parallel light by beam expander 102 and collimating lens 103. The parallel light illuminates an electrically controlled birefringence (ECB)-mode phase modulation-type liquid crystal spatial light modulator 104. The parallel light undergoes two-dimensional phase modulation by the computer hologram recorded on liquid crystal spatial light modulator 104. The prescribed pattern is imaged on the surface of material 106 by Fourier transformation lens 105. As a result, that part of the surface of the material irradiated by the laser either evaporates or is altered by heat, whereby the pattern is scribed. In the figure, 107 is a power source for driving the laser source, 108 is a drive circuit for the liquid crystal spatial light modulator and 109 is a control device for controlling these two. The characters or pattern to be scribed on the material is input from an input device 110. In this embodiment, a YAG laser with a wavelength of 1.06 mm is used as the laser source.

Next is a detailed explanation of how the data recorded on the liquid crystal spatial light modulator are prepared and control device 108.

In the invention, a pattern is generated from the computer hologram recorded on the liquid crystal spatial light modulator. This pattern is projected and scribed on the material. This is a major difference from the prior art in which the pattern was displayed as is on the liquid crystal spatial light modulator as an intensity distribution which was then projected and scribed on the material by a lens system.

In this embodiment of the invention, a kinoform (refer to IBM J. Res. Dev., Vol. 13, pp. 150–155 (1969)) is used as the computer hologram recorded on the liquid crystal spatial light modulator. This is because of the extremely high light utilization efficiency since kinoform can be recorded as a phase structure. Further, since one phase component corresponds to one pixel, the limited number of the pixels of the liquid crystal spatial light modulator can be used effectively.

The method by which the phase structure of kinoform is calculated is now explained. First, a random phase distribution is superposed on the input image (characters or pattern to be scribed) given as an amplitude distribution. Next, this complex data undergoes Fourier transformation. The result of extracting only the phase component of the Fourier-transformed image is the kinoform. According to our experiments, two values are sufficient for the random phase initially provided. The reproduced image is obtained by inverse Fourier transformation of the kinoform. However, this reproduced image generally has large errors with respect to the input image and much speckle noise. In the invention, the following two methods have been proposed for improving the quality of the reproduced image.

(1) Recursive calculation (2) Multiplex exposure

The recursive calculation method repeats calculation while connecting errors in the reproduced image with respect to the input image. A number of algorithms have been proposed; e.g., these are explained in detail in Optical Engineering Vol 19, pp. 297–305 (1980) and Applied Optics, Vol 12, pp 2328–2335 (1973). In the multiplex exposure method, a plurality of kinoforms with different phase structures are prepared from one image data, and patterns are successively reproduced from these kinoform, whereby the speckle noise on the material is averaged. The specific hardware configurations for realizing these respective methods are explained below.

(1) Recursive calculation

Figure 2:
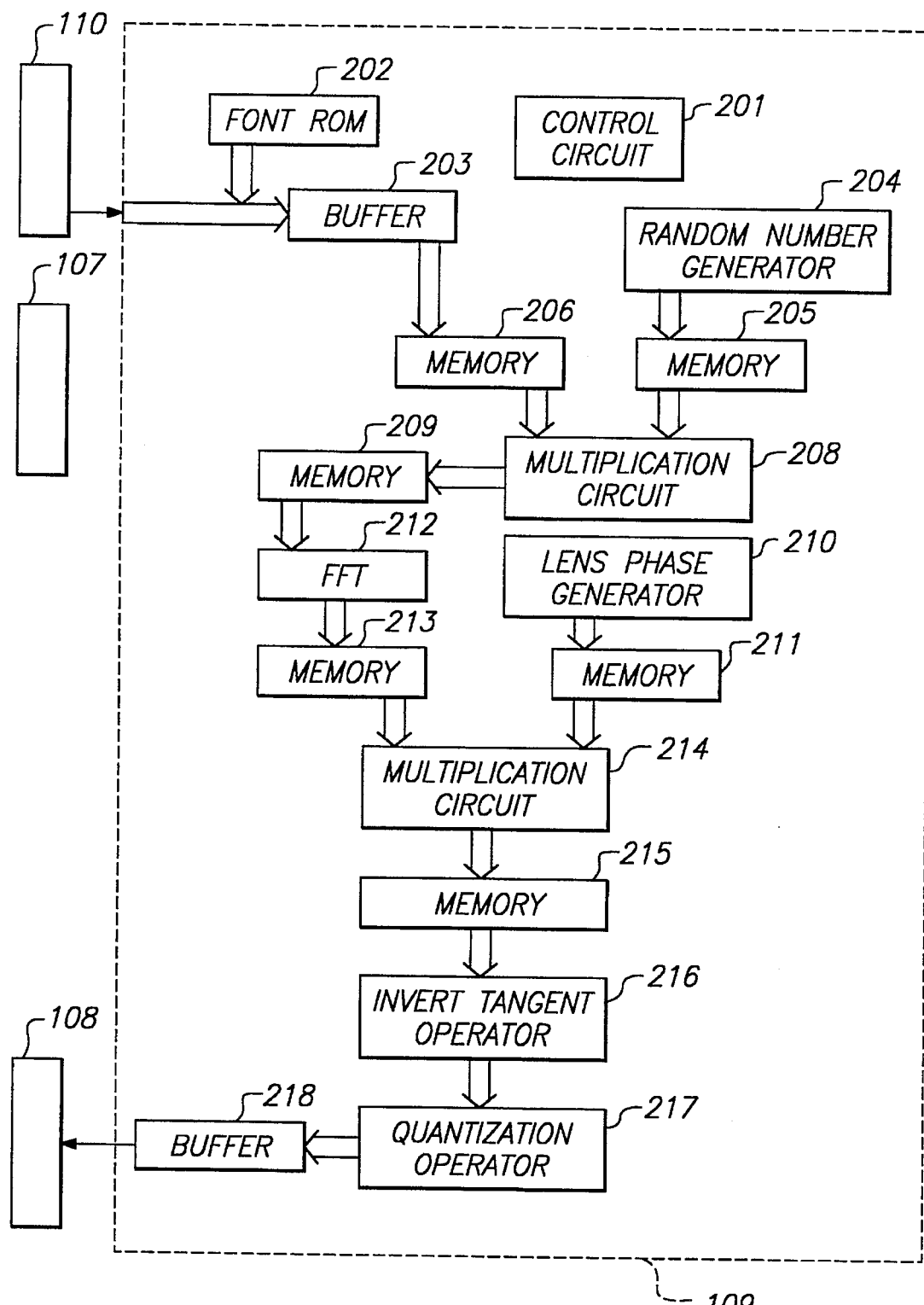
FIG. 2 is a block diagram of the control device of the laser scribing device.

FIG. 2 shows the configuration of control device 109 used in this embodiment. Control signals are sent from control circuit 201 to each of the circuits as required to efficiently perform the following processings with the proper timing.

The data input as character codes from input device 110 are stored in an input buffer 203 after being converted to dot matrix data in font ROM 202 (or as is if initially given as dot matrix data). The data are read out from the buffer to a memory 206 one character at a time.

A random number generation circuit 204 randomly generates data of two values (1 and −1 in this embodiment). These two values are grouped the same number of times as the number of dots in the character data and stored in memory 205. The data in memories 205 and 206 are multiplied together in multiplier circuit 208 for each dot. The results are stored in memory 209.

This data undergoes Fourier transformation in a two-dimensional, complex fast Fourier transform circuit 212. The resulting complex amplitude data are stored in memory 213. The lens data prepared by a lens phase generation circuit 210 are stored in memory 211. The data in memories 211 and 213 are multiplied together in multiplier circuit 214 for each dot. The results are stored in memory 215.

When only the phase data are extracted from these data by inverse tangent operation circuit 216 and quantized (16 levels in this embodiment) in a quantization operation circuit 217, the kinoform data are obtained. Also, these kinoform data are stored in an output buffer 218 and are sent one frame at a time to drive circuit 108 of the liquid crystal spatial light modulator.

When recursive calculation of the kinoform is performed, the phase data can be extracted from the data in memory 213 and the quantized data stored in memory 209. In this case, it is necessary to add an operation circuit that either determines the number of recursions or evaluates the errors. The lens phases are superposed after completion of recursion.

The necessity of lens phases in the above data preparation process is now explained. The maximum diffraction efficiency of the kinoform is ideally 100 percent, but in an actual recording to a spatial light modulator, there is only a little light that passes as is without receiving modulation in the spatial light modulator. This light becomes spot-shaped noise converged by a Fourier transformation lens. In order to remove this spot-shaped noise, a lens phase function is superposed on the kinoform in this embodiment. The light that receives modulation in the spatial light modulator forms an image at a position (reproduced image plane) separated from the focal plane of the Fourier transformation lens due to the lens phase. This makes the spot noise invisible. Also, by superposing the lens phase on the phase distribution of the kinoform, it is possible to reproduce the pattern without using a Fourier transformation lens or other optical elements. The position and size at which the pattern is reproduced can be freely changed by selecting the focal length of the lens phase. Further, a pattern with depth can be reproduced by superposing and recording a plurality of kinoform (refer to the publication Kogaku, Vol. 21, pp. 155–156 (1992)).

When kinoform data are prepared according to the recursive calculation method and scribing is performed by this control device 108, uniform scribing with little speckle noise is achieved and decreased quality due to quantization errors is suppressed.

(2) Multiplex exposure

In this case, the control device is the same as shown in FIG. 2. First, a plurality of random number data groups are prepared for one input image. Next, using the respective random number data, the kinoform data are prepared in control device 108. When these kinoform are each prepared one at a time, reproduced images with speckle noise having no mutual correlation are obtained. Therefore, by successively rewriting these kinoform, the speckle noise is averaged in the reproduced image, whereby the S/N ratio of the reproduced image is improved. Further, since deviations in characteristics between the pixels of the liquid crystal spatial light modulator cancel each other out, a reproduced image with even better quality is obtained.

By providing the reproduced image through Fourier transformation of the phase distribution of the kinoform, the intensity distribution I of the pattern obtained, when scribing is performed by successively rewriting the plurality of kinoform data, is given by $$I = S|F(K)|^2 \qquad (1)$$

Here, S is the sum of the intensity distributions and K is the phase distribution of the kinoform. From equation (1), it can be seen that, in addition to speckle noise, intensity fluctuations in the reproduced image plane are averaged and become inconspicuous.

When kinoform data are calculated and scribing is performed on hardware, such as control device 108, that is capable of executing this kind of multiplex exposure at high speed, scribing can be performed with better quality than the recursive calculation method. When the kinoform data are calculated using the multiplex exposure method, the algorithms introduced in the above recursive calculation method (e.g., Optical Engineering Vol. 19, pp. 297–305 (1980) and Applied Optics, Vol. 12, pp. 2328–2335 (1973) can be utilized.

Figures 3A, 3B, 4:
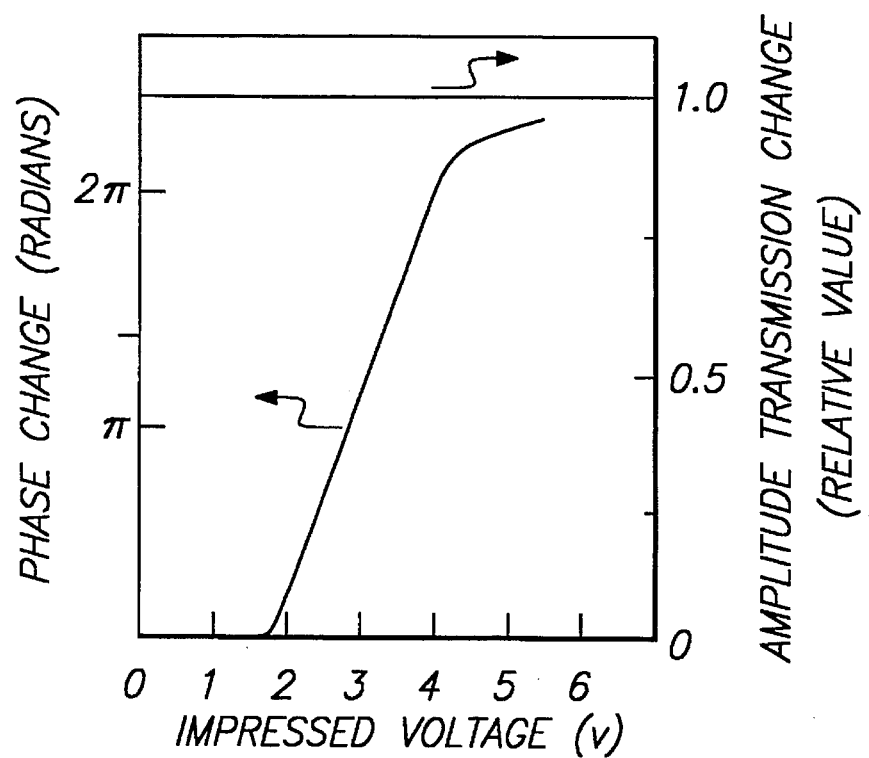

FIG. 3 shows an example of experimental results. First, a plurality of random number data are prepared for the two-value input image data (character parts are 1 and all others are zero). Next, the kinoform data are prepared using these respective random number data. When these kinoform are reproduced one by one, speckle noise with no mutual correlation is generated. These are then rewritten at high speed (video rate here). When this is done, the position of the reproduced image does not move, but the speckle noise are averaged in the reproduced image, whereby the S/N ratio of the image is improved. As shown in FIG. 3(a), speckle noise can no longer be seen in the scribed part. For comparison, the result of scribing by using just one kinoform is shown in FIG. 3(b). The speckle noise causes marked dropout in the character parts. Also, running due to speckle noise becomes noticeable around the character.

Control device 108 of this embodiment can calculate one kinoform (using 256×256 pixels) in approximately 10 ms. The kinoform is rewritten at video rate to match the response of the liquid crystal spatial light modulator. A trigger signal is sent to power source 107 for driving the laser drive according to timing in synchronism with this. The YAG laser is thus activated.

The liquid crystal spatial light modulator in this embodiment is now explained. The liquid crystal spatial light modulator is a matrix drive system having thin-film transistor (TFT) elements at each pixel, and is capable of at least rewriting at video rate. The initial orientation of the liquid crystal molecules is a homogeneous orientation with no twist. Only the phase of the light wave can be continuously modulated (refer to Extended Abstracts (The 51st Autumn Meeting, 1990), 26a-H-10, The Japan Society of Applied Physics). The number of effective pixels is 256×256, and the size of each pixel is 200×200 mm². The aperture is 190×190 mm², and the numerical aperture is 90%. The side of the liquid crystal spatial light modulator on which the laser is incident is treated with a nonreflective coat.

The retardation And of the liquid crystal layer is adjusted to match the wavelength (1.06 mm) of the YAG laser source, and a phase modulation of more than 2p is realized. The light modulation characteristic of the liquid crystal spatial light modulator is shown in FIG. 4. By setting the pre-tilt angle slightly high when orienting the liquid crystal molecules, the change in amplitude accompanying phase adjustment can be suppressed enough to present no problem in practical application. The azimuth of the linearly polarized light extracted from laser source 101 and the orientation of the liquid crystal spatial light modulator are arranged in the same plane. If the light from laser source 101 is randomly polarized light, a polarizing plate is disposed in front of the liquid crystal spatial light modulator such that the azimuth of the transmission axis of the polarizing plate is parallel to the orientation of the liquid crystal spatial light modulator.

This liquid crystal spatial light modulator is provided with a light-blocking film (black stripe) to protect the TFT elements. Generally, when a laser beam is incident on an object with a lattice structure such as a black stripe, higher order diffraction images appear in the reproduced image plane. The intensities of these diffraction images are given by $$\eta^m = \{(a/p)\text{sinc}(\pi ma/p)\}^4 \qquad (2)$$

Here, m is the diffraction order, p is the pixel pitch and a is the width of the pixel aperture.

In equation (2), a liquid crystal spatial light modulator with an extremely large aperture compared to the light-blocking member is used. That is, p=200 mm and a=190 mm. In this case, the zero point ($\pi ma/p=p$) of the sinc function in equation (2) nearly overlaps reproduced images of the first order or greater. At this time, the light gathered in the required reproduced image (0 order diffracted light) is 82 percent of the total. Since the intensity of the diffracted light of one order or greater with respect to the intensity of 0 order diffracted light is weak enough that it can be ignored, these duplicate images are not scribed on the material.

In the prior art amplitude mask method, only that part of the line that outlines the character or pattern becomes open. Therefore the utilization efficiency of the light ranges from several percent to a high of about 10 percent. Moreover, since it is necessary to scribe at maximum output even for characters with few dots to be scribed (e.g., periods, commas), it is understandable that light utilization efficiency is extremely low.

Since the intensity of higher order diffraction images is weak, this presents no problem. However, by using a dual-diffraction optical system with a space filter between two lenses, they can be completely eliminated. The invention is described in another embodiment below.

In the laser scribing device of this embodiment, the focal point is adjusted by changing the focal length of the lens data superposed on the kinoform data according to the distance from the liquid crystal spatial light modulator to the material to be scribed. Since the reproduced image can be placed at the desired position by changing the focal length of the lens, scribing on curved surfaces can be easily realized.

In the above embodiment, scribing is performed by recording kinoform data on the liquid crystal spatial light modulator, but it is possible to use holographic data calculated by Fresnel transformation or other optical transformation.

As compared to cases in which a prior art intensity modulation-type liquid crystal spatial light modulator is used as an open mask, in the above configuration, it is possible to (1) scribe patterns on materials with not only flat surfaces but also curved surfaces with a high light utilization efficiency and (2) scribe images faithful to the original image in which speckle noise and other nonuniform intensity distributions are eliminated by scribing while successively rewriting a plurality of kinoform data prepared from one input image and having mutually different phase structures.

In this embodiment, it is possible to use an optical writing-type liquid crystal spatial light modulator instead of a matrix drive-type liquid crystal spatial light modulator. Also, the type of laser source can be selected according to the type of material being scribed and its surface condition. Argon laser, semiconductor laser, etc., can be used in addition to YAG laser. Further, depending on the laser wavelength, the retardation of the liquid crystal spatial light modulator can be adjusted to obtain a sufficient phase modulation characteristic.

Second Embodiment

As described in the first embodiment, since the pattern is reproduced by the wavefront regenerative action of the phase function recorded on the phase modulation-type liquid crystal spatial light modulator, the light utilization efficiency of the scribing method of the invention is extremely good. However, since constant light passes through regardless of the character pattern, characters with few dots to be scribed (e.g., periods, commas) are bright, while characters with many dots (e.g., kanji with many picture elements) are dark.

Figure 5:
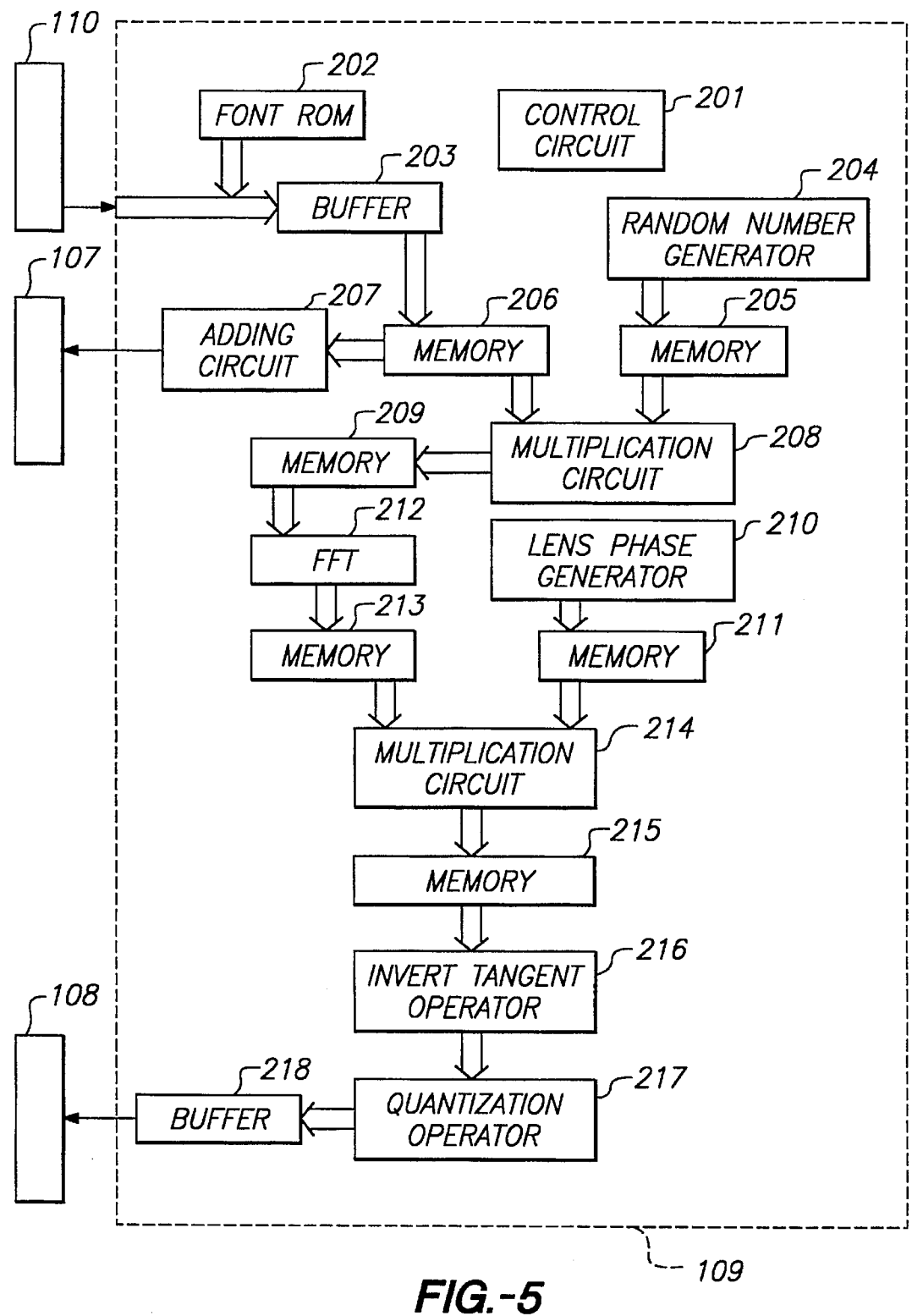
FIG. 5 shows the laser scribing device of the second embodiment.

This is solved by the invention as described below. An adder circuit 207 is added to control device 108 in FIG. 2. The number of display dots of the character data in memory 206 are counted by this adder circuit 207 (FIG. 5). In addition to the trigger signal described above, a signal that indicates the total number of display dots is sent to power source 107. Power source 107 adjusts the intensity of the excitation light according to this signal so that the intensity of the reproduced images is constant.

Due to the high light utilization efficiency of this method, energy consumption is low because of the small number of patterns requiring a large laser output, which is also beneficial for cooling of the device.

Third Embodiment

Figure 6:
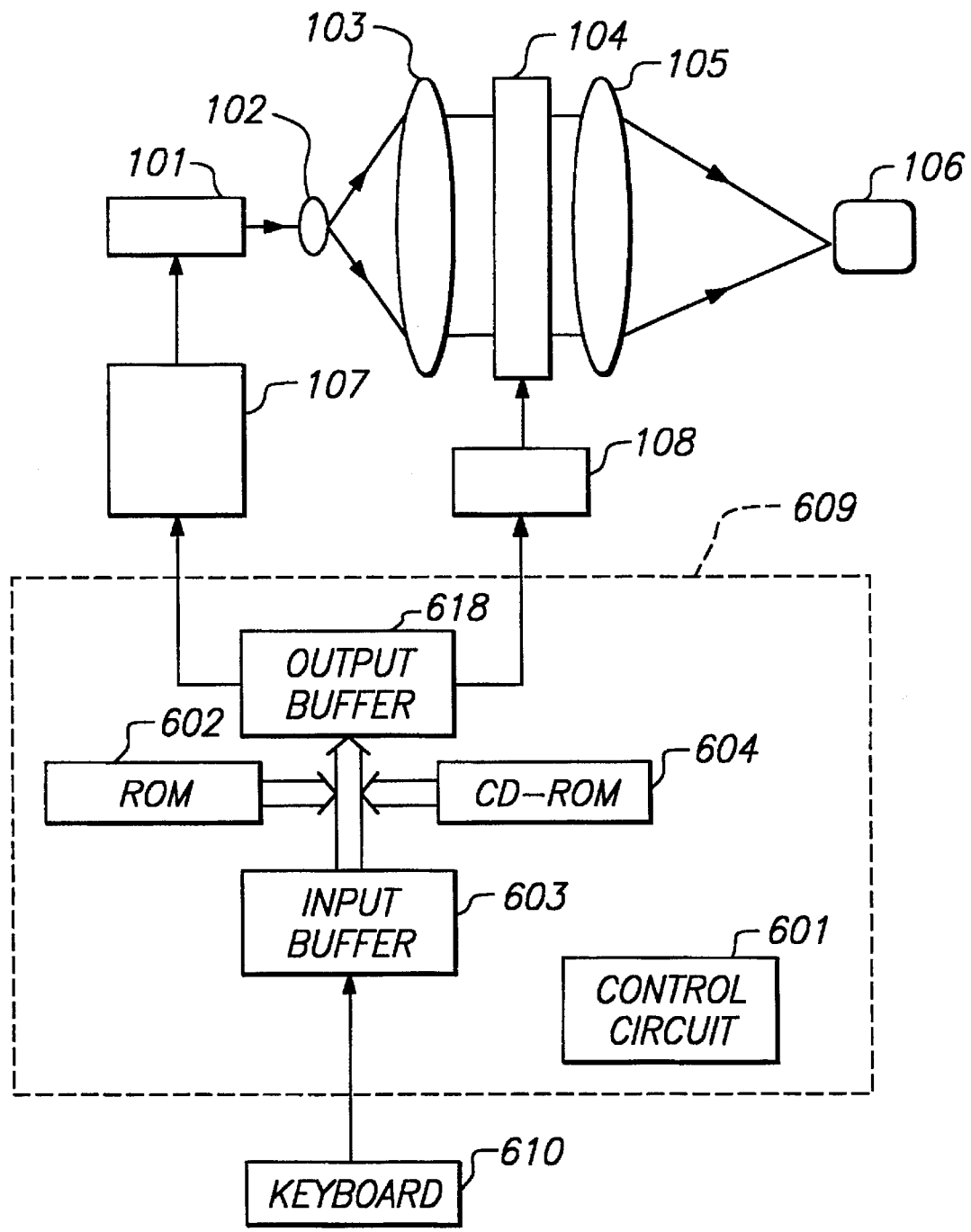
FIG. 6 shows the laser scribing device of the third embodiment.

Another configuration of the laser scribing device of the invention is shown in FIG. 6. The overall configuration is the same as the first embodiment. However, while the data sent to the liquid crystal spatial light modulator are calculated in succession in the first embodiment, previously prepared data are used in this embodiment.

Since the following processings are performed efficiently according to a prescribed timing as in the first embodiment, control signals are sent from a control circuit 301 to each of the circuits as required.

The character codes entered from a keyboard 310 are stored in an input buffer 603. The kinoform data corresponding to these character codes are read out sequentially from ROM 602 or from CD-ROM 604 and are then stored in output buffer 618. Also, these data are sent one frame at a time to drive circuit 108 of the liquid crystal spatial light modulator. In addition to the kinoform data, the number of display dots of the character data to be scribed is stored in the ROM or CD-ROM.

In order to reduce the speckle noise of the kinoform, pattern scribing is also performed by a multiplex exposure method in this embodiment. First, a plurality of random data are prepared for one input image data. Next, using these respective random data, the kinoform data are prepared. When each of these kinoform is reproduced, speckle noise with no mutual correlation is generated. By rapidly (at video rate) rewriting these, the speckle noise is averaged on the reproduced image plane, without moving the position of the reproduced image. The S/N ratio of the image is improved. Since the deviation in the characteristics between the pixels of the liquid crystal spatial light modulator cancel each other out, a high quality reproduced image is obtained. In fact, absolutely no speckle noise can be seen in the reproduced image obtained.

In addition to the multiplex exposure method, a simulated annealing method (refer to *Science* Vol. 220, pp. 671–680 (1983)) is used for calculating the kinoform data in this embodiment. By utilizing data after the cost function value has been made sufficiently small and converged, kinoform data with an optimized phase structure can be obtained. A reproduced image faithful to the input image can be obtained. Therefore, multiplexing of the data is not necessary since scribing is performed with one kinoform, thus allowing a large reduction in the storage capacity.

In this embodiment, the 256 characters in the form of ASCII code are stored in the ROM. Various font characters and symbols, including kanji characters, are stored in the CD-ROM. Other font characters and symbols can be scribed by changing the CD-ROM.

A CD-ROM is used for recording data in this embodiment. However, a magneto optical disc or hard disk may also be used. It is also possible to combine either of these with the first or the second embodiment.

Fourth Embodiment

This embodiment has the configuration of the third embodiment with an added mechanism for adjusting the laser output. In addition to kinoform data, the number of display dots of the character data to be scribed is stored in the ROM or CD-ROM in FIG. 6. A signal indicating this number of display dots is sent to power source 107. Power source 107 adjusts the intensity of the excitation light according to this signal so that the intensity of the reproduced image is constant.

Due to the high light utilization efficiency of this method, energy consumption is low because of the small number of patterns requiring a large laser output, which is also beneficial for cooling of the device.

Fifth Embodiment

Figure 7:
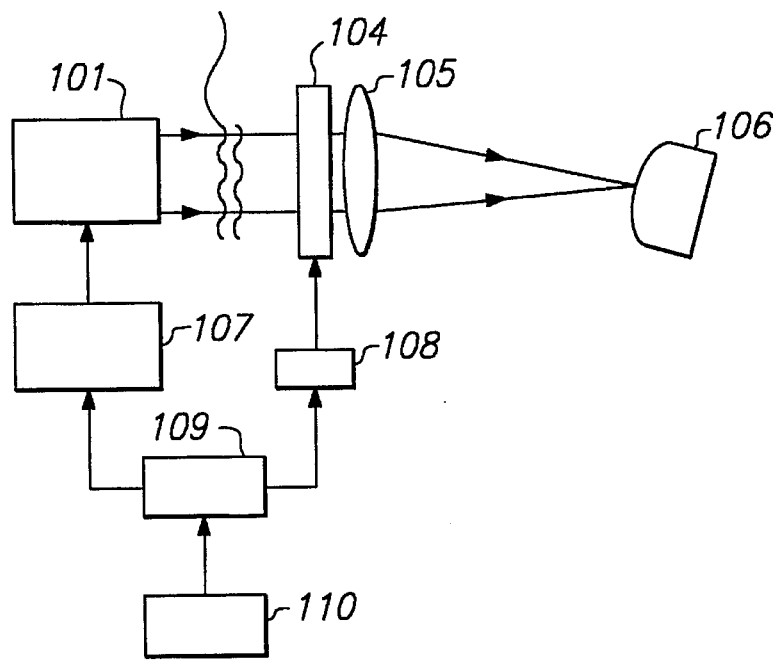
FIG. 7 shows the laser scribing device of the fifth embodiment.

FIG. 7 shows this embodiment. Here, the light from the laser source is directly incident on the liquid crystal spatial light modulator. There are aberrations in the wavefront of the light from the laser source that are specific to the structure of the laser resonator. Therefore, a means is employed that scribes while correcting these aberrations.

First, the aberrations are measured in advance. The aberration correction data that describe the complex conjugate wavefront are stored in memory. The data may be stored in part of the memory or part of the ROM in the configurations of the first to the fourth embodiments. The data may also be stored in a dedicated memory provided separately. Also, these data are recorded on liquid crystal spatial light modulator 104 superposed on the kinoform data in synchronism with the timing of scribing. By correcting aberrations in the laser beam in this way, correct patterns can be scribed with no distortion.

Figure 8:
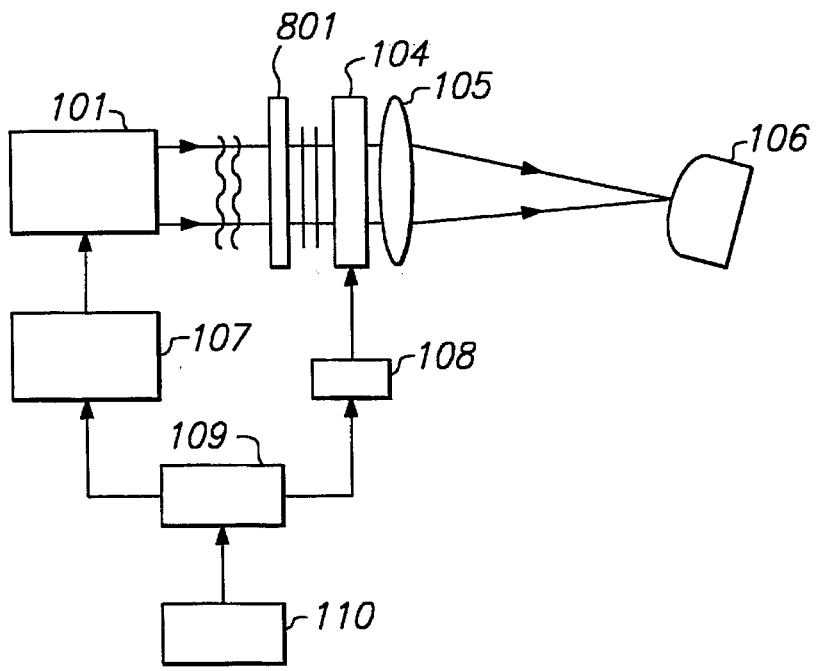
FIG. 8 shows another laser scribing device of the fifth embodiment.

FIG. 8 shows another configuration. Phase mask 801 that generates a complex conjugate wavefront of the aberrated wavefront is disposed in front of the liquid crystal spatial light modulator. Phase mask 801 is made by ion etching of a glass or quartz substrate. This phase mask can be formed in advance on the substrate on the side of the liquid crystal spatial light modulator where the laser beam is incident.

An anamorphic optical element or other aspheric optical element is also effective as the means for correcting aberrations.

Sixth Embodiment

This embodiment features a light-guide member disposed behind the liquid crystal spatial light modulator in the first to the fitch embodiments. It is explained here by combining the first embodiment with a light-guide member configured from a plurality of prisms.

Figure 9:
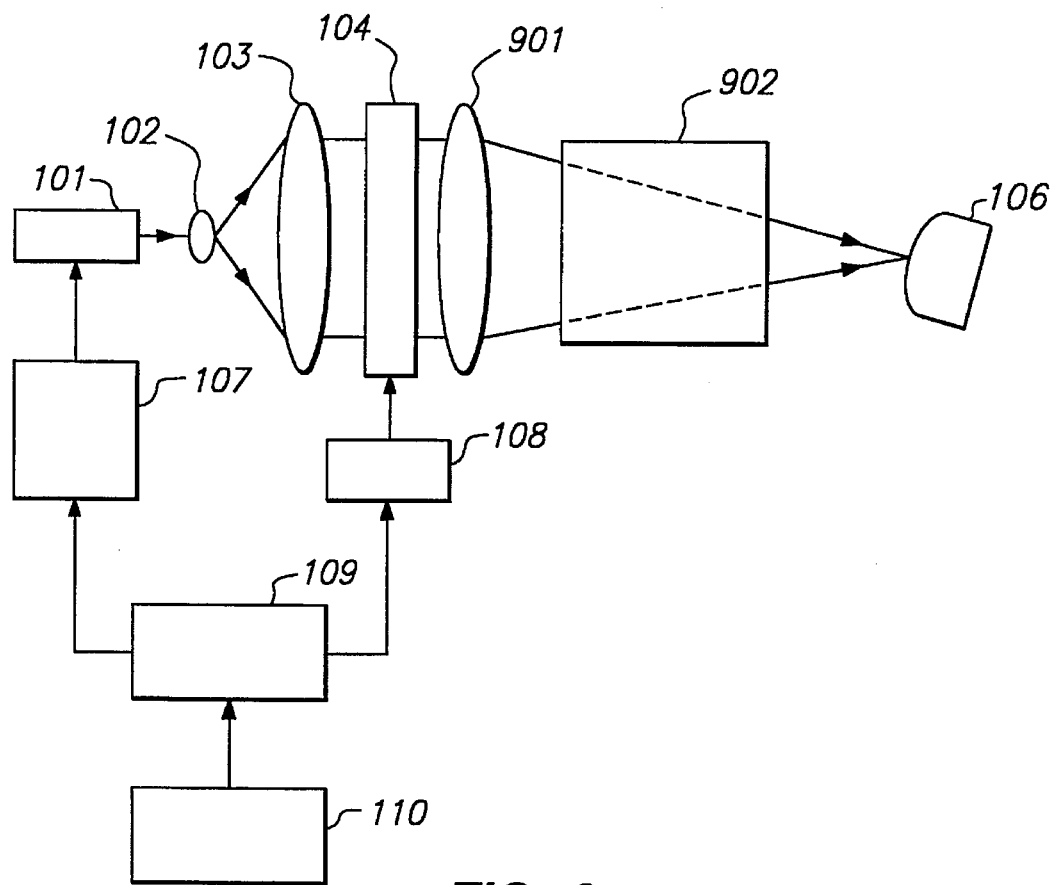
FIG. 9 shows the laser scribing device of the sixth embodiment.
Figure 10A:
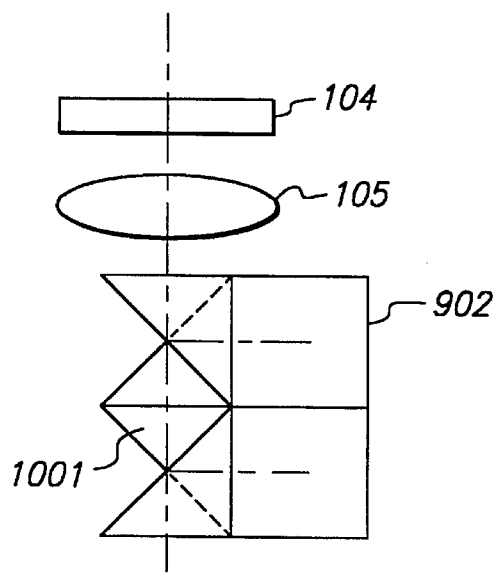
FIG. 10(a) is a side view of the light-guide member.
Figure 10B:
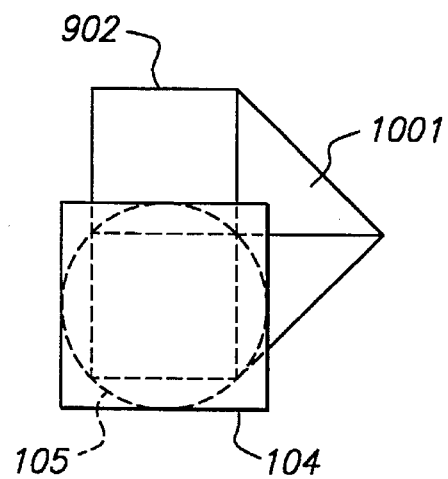
FIG. 10(b) is a plan view of the light-guide member.

As shown in FIG. 9, the prescribed pattern is scribed on the surface of material 106 via Fourier transformation lens 901 and light-guide member 902. FIG. 10(a) and 10(b) are a side view and a plan view (from above), respectively, of light-guide member 902. Light-guide member 902 comprises a plurality of transparent prisms 1001. The laser beam travels through these prisms while undergoing total reflection at the interface between the prism and air. By utilizing total reflection to change the direction of travel of the laser beam, loss of light energy is much smaller than when a plurality of metal mirrors are used. Of course, in order to satisfy the conditions of total reflection, the focal length of Fourier transformation lens 801 and the focal length of the lens that is recorded on the liquid crystal spatial light modulator are established in advance.

Using a light-guide member makes it possible to shorten the length of the light path and make the device more compact.

Seventh Embodiment

Figure 11:
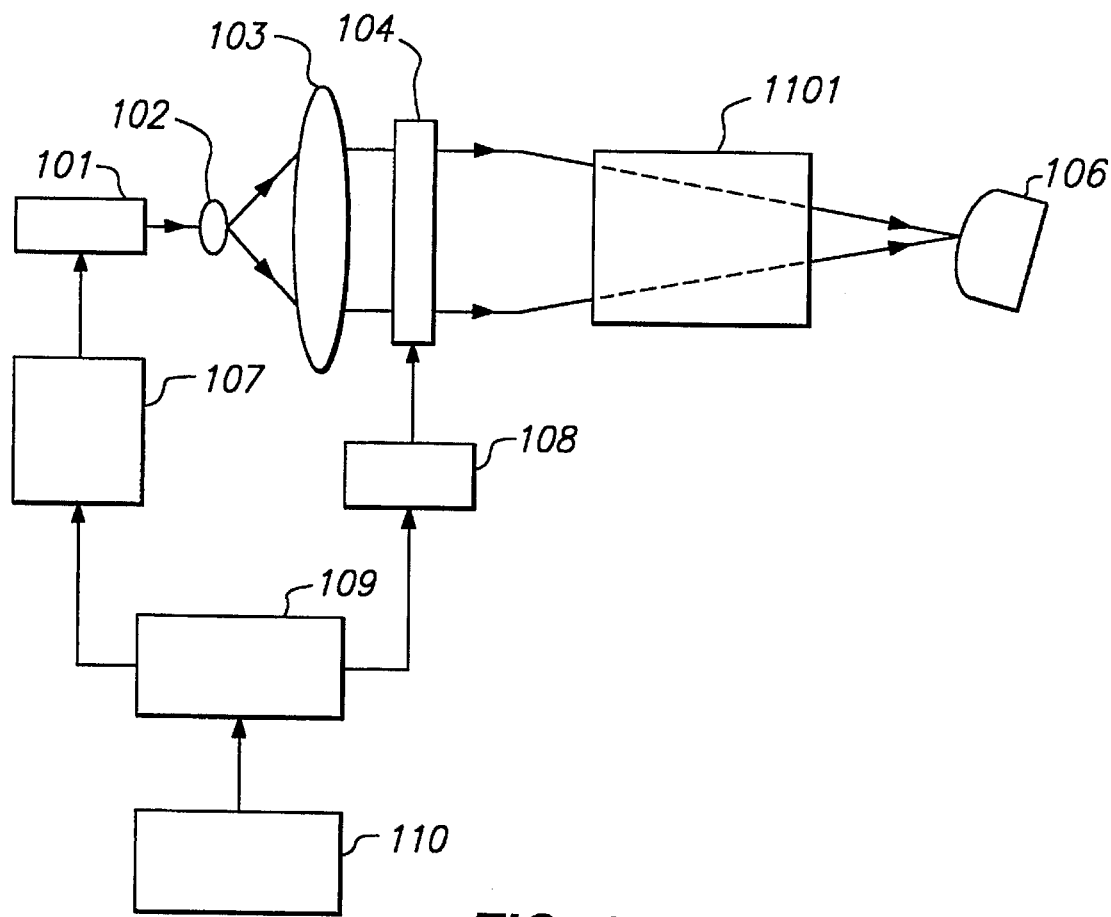
FIG. 11 shows the laser scribing device of the seventh embodiment.

This embodiment features a dual-diffraction optical system disposed behind the liquid crystal spatial light modulator. The dual-diffraction optical system comprises a Fourier transformation lens, a spatial filter and an auxiliary lens. The overall configuration is shown in FIG. 11. The prescribed pattern is imaged and reproduced on the surface of material 106 via dual-diffraction optical system 1101. The magnification ratio of dual-diffraction optical system 1101 can be freely changed depending on the purpose.

Figure 12:
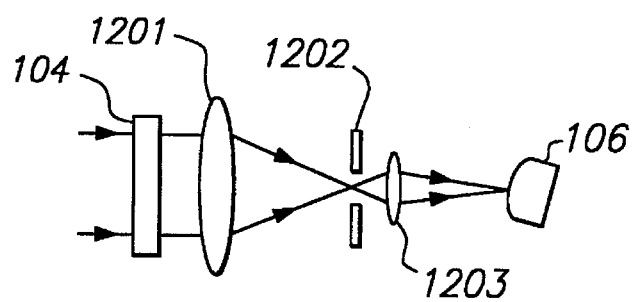
FIG. 12 shows the dual-diffraction optical system.

The dual-diffraction optical system is shown in FIG. 12. Fourier transformation lens 1201 is used to reproduce the pattern from the kinoform recorded on the liquid crystal spatial light modulator. Here, in order to shorten the length of the light path, a Fourier transformation lens 1201 with a relatively short focal length is used. In order to eliminate the higher order diffraction images generated due to the pixel arrangement on the liquid crystal spatial light modulator, spatial filter 1202 is disposed near the Fourier transformation plane of Fourier transformation lens 1201. Spatial filter 1202 is configured such that the size of its aperture can be changed as required. Auxiliary lens 1203 is disposed behind spatial filter 1202 so that the pattern to be reproduced can be enlarged in size and projected on the surface of the material.

The introduction of a dual-diffraction optical system makes it possible to eliminate higher order images and other spurious light so that the prescribed pattern is sharply scribed.

Eighth Embodiment

This embodiment features a drive mechanism for the auxiliary lens in the configuration (with a dual-diffraction optical system) of the seventh embodiment and a light-guide member disposed on the light path of the dual-diffraction optical system.

Figure 13:
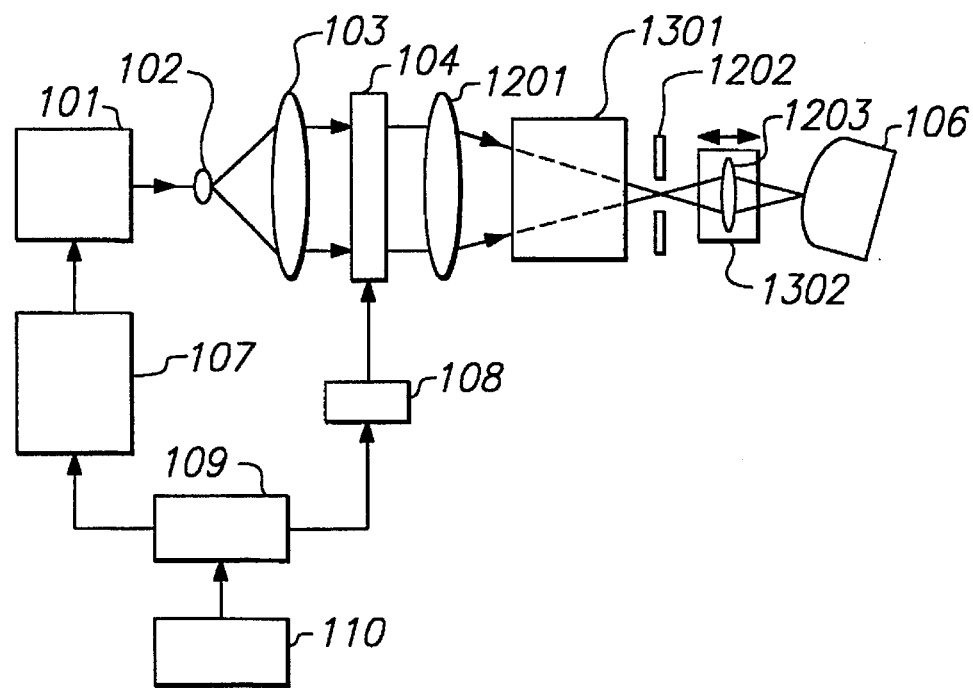
FIG. 13 shows the laser scribing device of the eighth embodiment.

The configuration is shown in FIG. 13. Here, spatial filter 1202 is disposed outside light-guide member 1301, although it can also be disposed inside light-guide member 1301. Drive mechanism 1302 controls the position of auxiliary lens 1203. The imaging magnification ratio of the pattern can be changed within a wide range by adjusting the position of auxiliary lens 1203 with drive mechanism 302. Since the imaging plane of the pattern shifts back and forward at this time, it is necessary to move a Fourier transformation lens 1201 and spatial filter 1202 at the same time. In this configuration, Fourier transformation lens 1201 and spatial filter 1202 are fixed to one support member, and therefore only the support member need be moved. Further, by adjusting the focal length of the lens phase function superposed on the kinoform data, the size of the scribing pattern can be finely adjusted.

Ninth Embodiment

This embodiment utilizes an amplitude-phase modulation-type liquid crystal spatial light modulator capable of simultaneously and independently controlling the amplitude and phase of the light wave as the means for recording the hologram data for pattern reproduction. Other principal configuration elements are the same as those in previously described embodiments.

Figure 14:
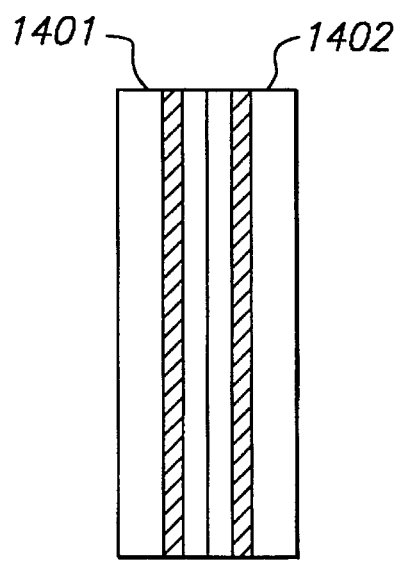
FIG. 14 is a cross section of the amplitude-phase modulation-type spatial light modulator in the ninth embodiment.

FIG. 14 shows the configuration of the amplitude-phase modulation-type liquid crystal spatial light modulator. In this configuration, a TN-mode liquid crystal spatial light modulator 1401 and an ECB-mode liquid crystal spatial light modulator 1402 are coupled together at a suitable interval with their corresponding pixels facing each other. The amplitude of the light wave is modulated by the TN-mode liquid crystal spatial light modulator 1401, and the phase is modulated by the ECB-mode liquid crystal spatial light modulator 1402 (refer to Extended Abstracts (The 52nd Autumn Meeting, 1991), 10a-ZK-2, The Japan Society of Applied Physics). The hatched areas in the figure are the liquid crystal layers in the respective liquid crystal spatial light modulators.

By utilizing an amplitude-phase modulation-type liquid crystal spatial light modulator, a good three-dimensional image can be reproduced, thus facilitating high quality scribing on material with curved surfaces.

Tenth Embodiment

Figure 15:
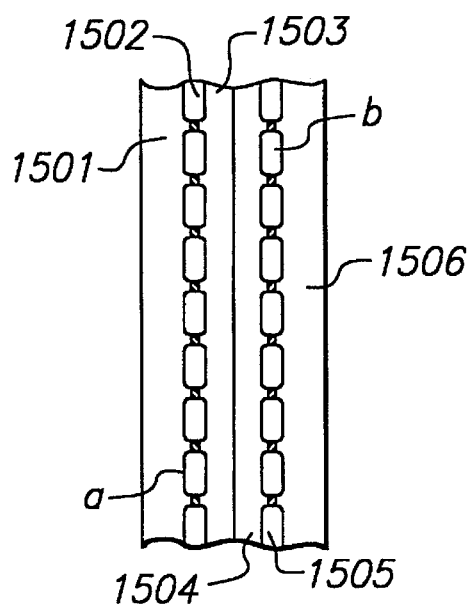
FIG. 15 is a cross section of the liquid crystal spatial light modulator in the tenth embodiment.

FIG. 15 shows the configuration of the liquid crystal spatial light modulator in the optical device of the invention. The liquid crystal spatial light modulator comprises two phase modulation-type liquid crystal spatial light modulators a and b disposed forward and back such that their respective corresponding pixels properly face each other. Liquid crystal spatial light modulators a and b are both ECB-mode matrix drive types. Their respective liquid crystal molecular orientations are perpendicular to each other. Liquid crystal spatial light modulator a performs phase modulation of one of the two polarized components, while liquid crystal spatial light modulator b performs phase modulation of the other polarized component. In the figure, 1501, 1502 and 1503 indicate the element substrate, the liquid crystal layer and the opposing substrate, respectively, of liquid crystal spatial light modulator a. Similarly, 1504, 1505 and 1506 indicate the element substrate, the liquid crystal layer and the opposing substrate, respectively, of liquid crystal spatial light modulator b. Also, the hatched areas in liquid crystal layers 1502 and 1505 are light-blocking films.

By making opposing substrates 1503 and 1504 sufficiently thin and optimizing the size of the aperture of liquid crystal spatial light modulator b, diffracted light that has passed through the desired pixels of liquid crystal spatial light modulator a is prevented from leaking to the aperture of the pixels of liquid crystal spatial light modulator b. The remaining configuration (other than the liquid crystal spatial light modulators) and the associated functions are the same as those in the embodiments described above except that the number of drive circuits of the liquid crystal spatial light modulators is different.

By using the above configuration, all of the polarized components of the light emitted from the light source can be utilized to scribe patterns.

Eleventh Embodiment

Figure 16:
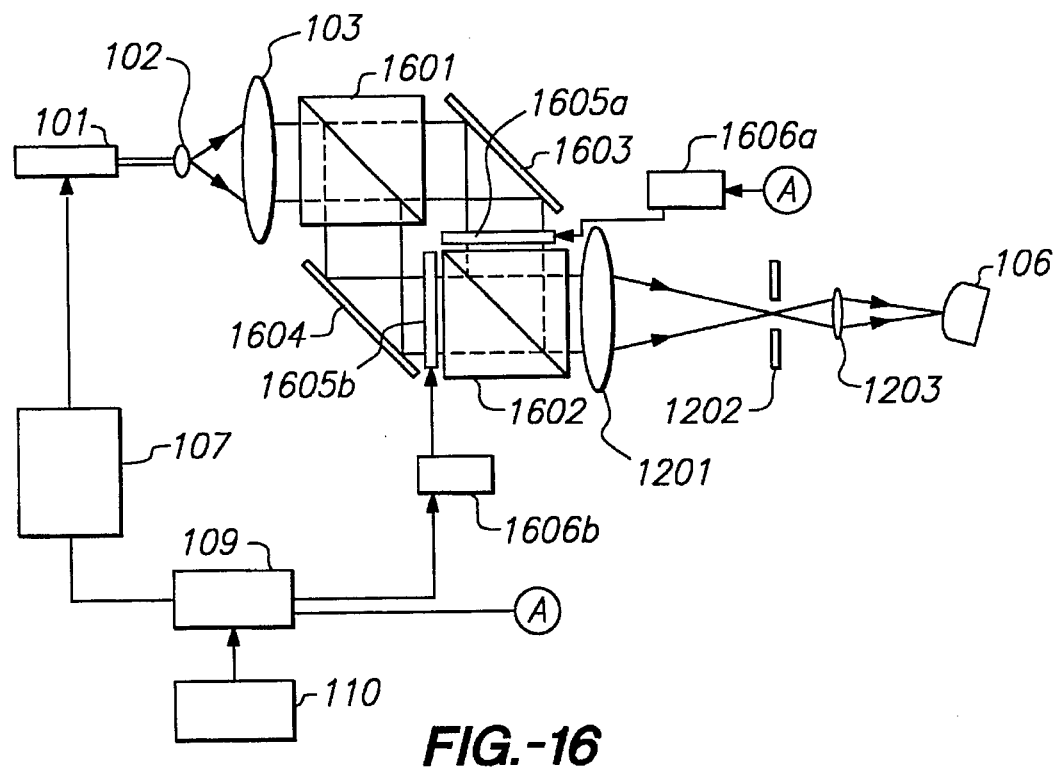
FIG. 16 shows the laser scribing device of the eleventh embodiment.

FIG. 16 shows the configuration of the optical device of the invention. A beam emitted from a laser source 101 is expanded into parallel light by a beam expander 102 and a collimating lens 103. A polarized beam, splitter 1601 splits the parallel light into two polarized components perpendicular to each other, which are then incident on ECB-mode phase modulation-type liquid crystal spatial light modulators 1605a and 1605b. Further, the prescribed pattern is reproduced from the respective polarized components by using the Fresnel transform-type kinoform data recorded on liquid crystal spatial light modulators 1605a and 1605b. The kinoform data recorded on two liquid crystal spatial light modulators 1605a and 1605b may or may not be the same. The directions of orientation of the liquid crystal molecules in liquid crystal spatial light modulators 1605a and 1605b are made perpendicular to each other. The two polarized components that pass through liquid crystal spatial light modulators 1605a and 1605b are guided by mirrors 1603 and 1604 and recombined in a polarized beam splitter 1602, from which they are incident on the dual-diffraction optical system. The remaining configuration and associated functions are the same as in the previously described embodiments except for the number of drive circuits for the liquid crystal spatial light modulators. In the figure, 1606a and 1606b are the respective drive circuits of liquid crystal elements 1605a and 1605b. Descriptions of the control device, input device and laser power source in the figure are omitted here.

The configuration in FIG. 16 is based on the seventh embodiment, but it is not limited to this. The configuration can be based on any of the first to the eighth embodiments.

By using the above configuration, all of the polarized components of the light emitted from the laser source can be utilized to scribe patterns.

Twelfth Embodiment

This embodiment features a means for measuring the surface shape of the material to be scribed on at the place of scribing.

The means that measures the surface shape of the material includes an autofocus method, a pattern projection method and a light interference method (refer to O plus E, No. 126, 87096 (1990)). The kinoform data (or hologram data) are prepared by computer from the shape data obtained by these means and displayed on the liquid crystal spatial light modulator.

By providing a means for measuring the surface shape of the material to be scribed on, scribing can be performed more quickly on a variety of materials with no specific surface shape.

Thirteenth Embodiment

Figure 17:
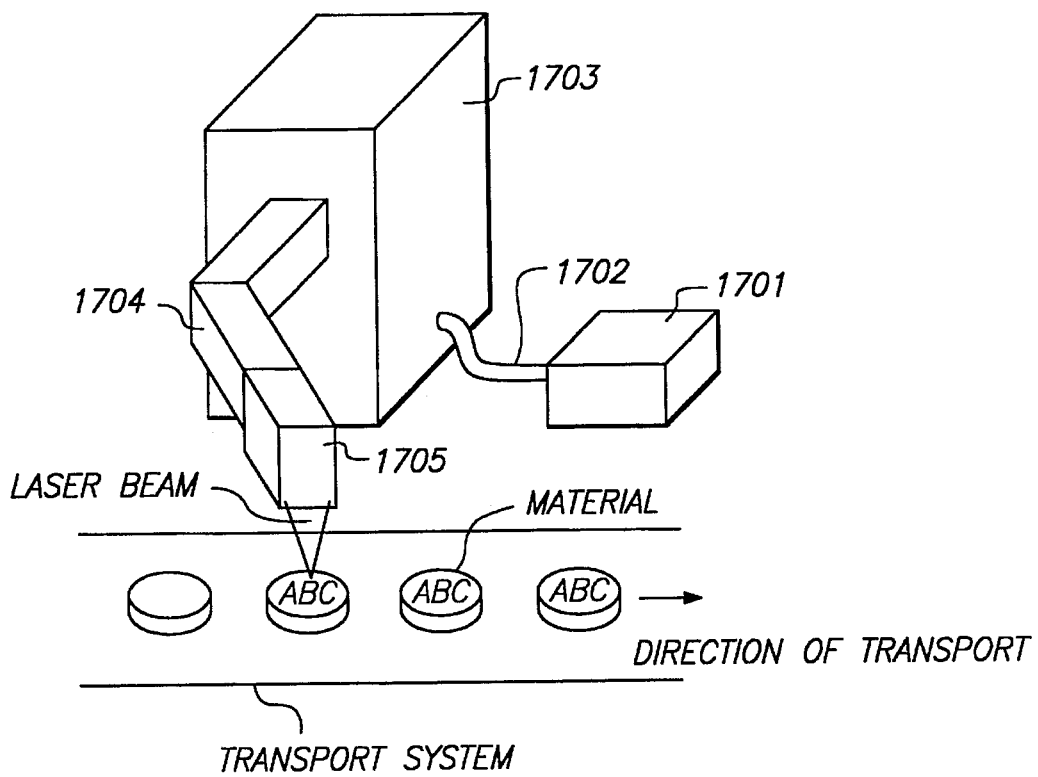
FIG. 17 is a perspective view of the laser scribing system of the thirteenth embodiment.

FIG. 17 shows a robot on which the laser scribing device of the invention is mounted. The robot is an articulated robot. A laser scribing device 1705 described in the previous embodiments is mounted on an arm 1704. A laser source 1701 is disposed separately from a main robot unit 1703. A beam emitted from laser source 1701 is guided by an optical fiber 1702. After the beam is expanded into parallel light by the collimating lens in laser scribing device 1705, it illuminates the liquid crystal spatial light modulator in laser scribing device 1705. The pattern is then reproduced from the kinoform recorded on the liquid crystal spatial light modulator and is scribed on the material.

Depending on the structure of the robot and the operating environment, the optical fiber can be disposed either (1) on the surface of the robot housing or (2) inside the housing. In FIG. 5, the drive circuit for the liquid crystal spatial light modulator, the memory, the computer, etc., are omitted.

By mounting the laser scribing device on an articulated robot, the following advantages are obtained:

(1) A plurality of different patterns can be scribed on one material by updating the phase structure recorded on the liquid crystal spatial light modulator in synchronism with the movement of the robot arm.

(2) Different patterns can be scribed on a plurality of materials by updating the phase structure recorded on the liquid crystal spatial light modulator in synchronism with the movement of the robot arm.

(3) High quality scribing can performed even on materials with complex shapes because the position of the liquid crystal spatial light modulator can be determined with high precision by controlling the robot arm.

In the configuration of this embodiment, the laser source, drive circuit for the liquid crystal spatial light modulator, memory, computer, etc., can all be disposed inside the robot housing.

Fourteenth Embodiment

A three-dimensional formation device that applies the optical device of the invention is now explained.

Figure 18:
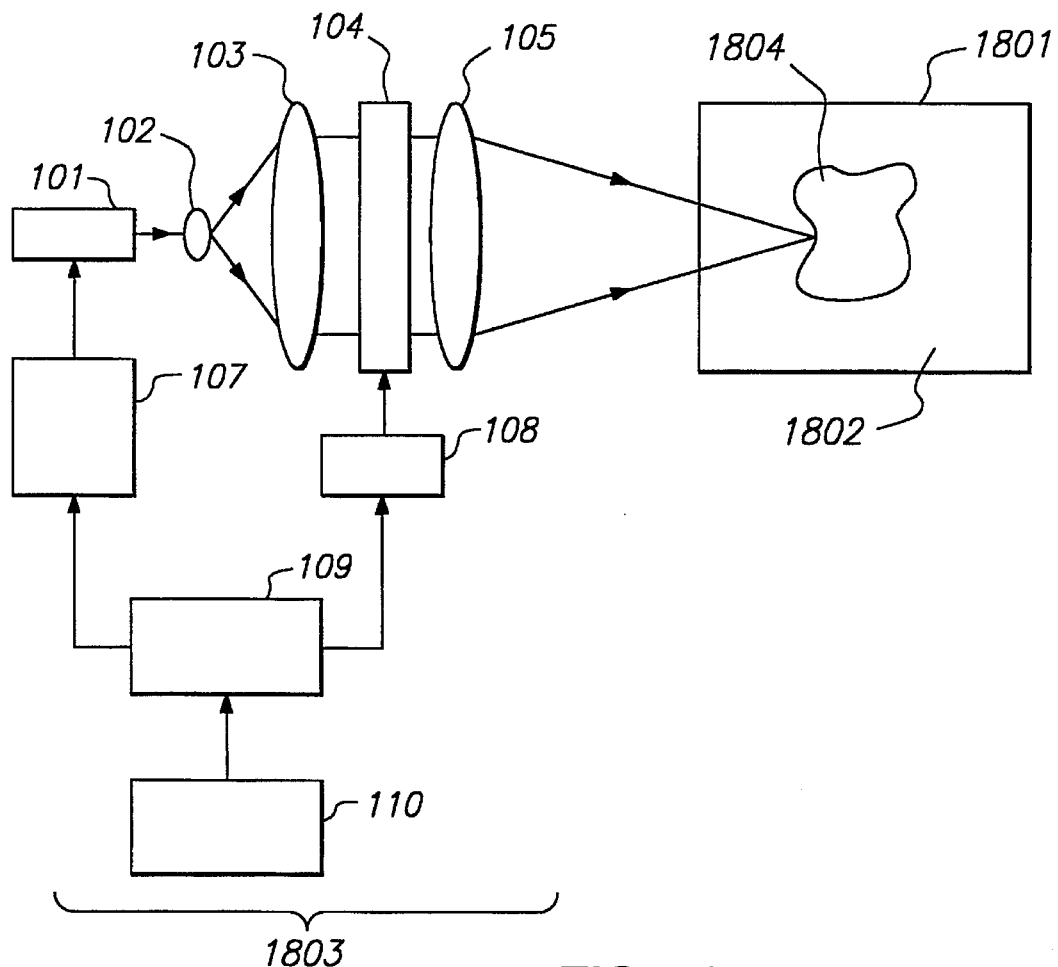
FIG. 18 shows the three-dimensional formation device of the fourteenth embodiment.
Figure 20:
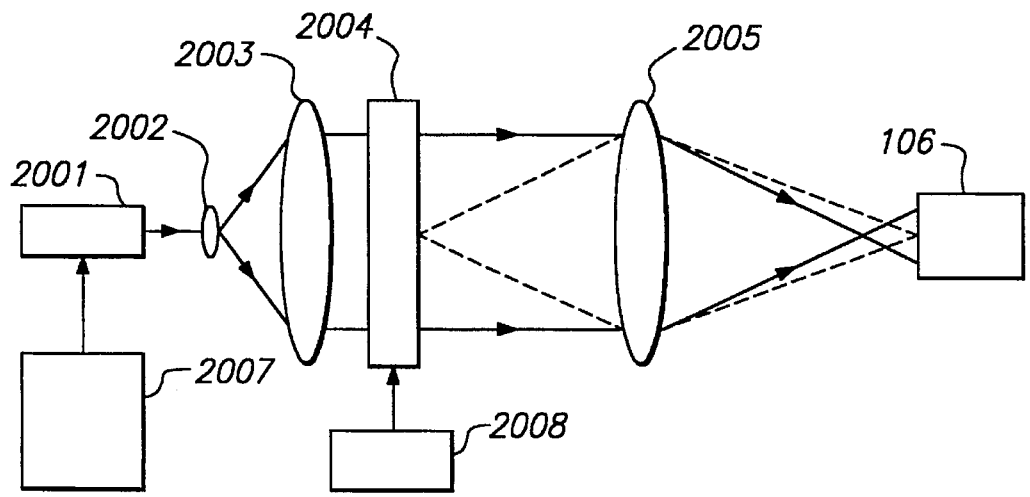
FIG. 20 shows a prior art laser scribing device.

FIG. 18 shows the configuration of the three-dimensional formation device. First, using optical device 1803 of the invention, a two-dimensional pattern 1804 is reproduced in resin bath 1801 filled with photocuring resin 1802. This causes the resin to harden in the shape of pattern 1804. Next, the focal length of the lens function superposed on the kinoform data is changed, a pattern corresponding to a different part is reproduced, and the resin at that part is hardened. By repeating this process, a three-dimensional object is ultimately formed.

Figure 19A:
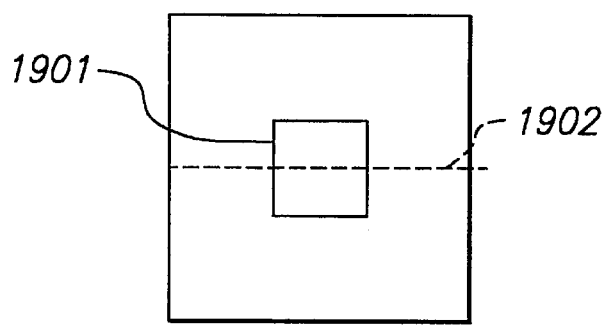
FIG. 19 shows the hardened pattern and its intensity distributions.
Figure 19B:
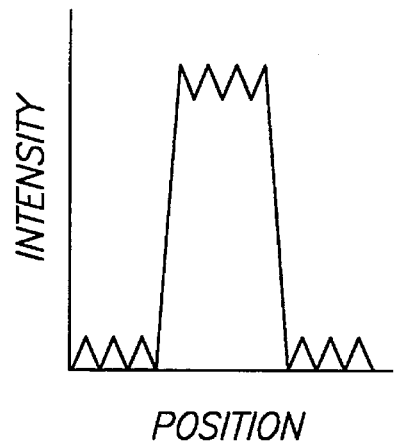
Figure 19C:
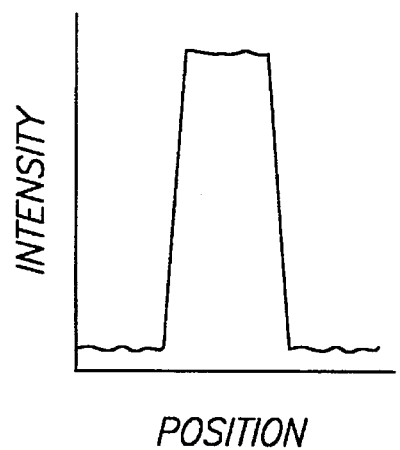

Also by using the invention, the generation of speckle noise is suppressed by using the recursive calculation method or multiplex recording method described in the embodiments, thus allowing uniform resin hardening with no unevenness. Examples of experimental results are shown in FIG. 19. FIG. 19(a) shows the pattern to be reproduced. Only square area 1901 is hardened and the area outside square area 1901 is left unhardened. When one set of kinoform data are reproduced, the intensity distribution on straight line 1902 of FIG. 19(a) becomes as shown in FIG. 19(b). Deviations in this intensity are due to speckle noise. When a plurality of kinoform data are reproduced while successively rewriting them by using the multiplexing recording method, however, the speckle noise is averaged and deviations in the intensity are eliminated as shown in FIG. 19(c). By hardening the resin in this manner, resin outside the square area hardens very little even if relatively strong light should strike it momentarily since the accumulated exposure is small. Inside the square area, however, the accumulated exposure is uniform everywhere and there are no dropouts in the pattern.

As described above, while the resin on one plane surface is being hardened, patterns are reproduced by successively rewriting a plurality of kinoform data by using either recursive calculation or multiplex exposure method. When the resin has been sufficiently hardened, the focal length of the lens function superposed on the kinoform data is changed and the same process is repeated. By this means, a high quality, three-dimensional object is formed.

Since the light utilization efficiency is high and there is no need to scan the laser beam two dimensionally in this embodiment, three-dimensional objects can be quickly formed.

A phase modulation-type liquid crystal spatial light modulator is used in this embodiment. Alternatively, by using an amplitude-phase modulation-type liquid crystal spatial light modulator, a three-dimensional image can be reproduced all at once, thus further simplifying three-dimensional formation.

According to the invention, patterns are reproduced from computer holograms recorded on a liquid crystal spatial light modulator. These patterns are projected and scribed on a material. This is a principal difference from the prior art in which scribing was performed by displaying the patterns as is on the liquid crystal spatial light modulator as intensity distributions and projecting the intensity distributions on the material by a lens system.

The optical device of the invention offers the following advantages.

(1) By reproducing patterns from computer holograms recorded on phase modulation-type liquid crystal spatial light modulators, desired patterns can be scribed on both flat and curved surfaces with extremely high light utilization efficiency.

(2) By using the recursive calculation or multiplex exposure methods described above, nonuniform intensity components occurring in the reproduced image plane are eliminated and high quality scribing with no dropout or running can be performed.

(3) Demand for scribing a large variety of patterns a little at a time can be easily accommodated by merely changing the data input to the liquid crystal spatial light modulator. Therefore, the work and cost required to produce masks can be greatly reduced.

(4) Further, by mounting the optical device of the invention on a robot and using it, restrictions on the shape, attitude, etc., of the material to be scribed on can be greatly relaxed, thus facilitating scribing with good productivity.

(5) In application to three-dimensional formation using photocuring resin, high quality formation can be completed in a short time.

The above advantages are expected to greatly further the practical application of at least optical scribing devices and optical three-dimensional formation devices.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An optical device for reproducing an original image pattern on a subject material, the original image pattern being represented by original image pattern data, the optical device, comprising:

a coherent light source that emits a light having a wavefront;

rewritable spatial light modulation means for controlling the wavefront of the light emitted from said light source to produce a plurality of image patterns on the subject material for reproducing the original image; and electric processing means for generating a plurality of computer hologram data groups and for sequentially supplying the computer hologram data groups to said rewritable spatial light modulation means, said electric processing means including:

means for receiving and storing the original image pattern data, means for generating a plurality of random phase distribution data groups, means for multiplying the original image pattern data by each group of the random phase distribution data to produce, respectively, a plurality of data sets, and means for converting the plurality of data sets produced from said multiplying means to a plurality of computer hologram data groups, respectively, with each computer hologram data group representing one image frame;

wherein the random phase distribution data groups are statistically uncorrelated one another;

wherein said electric processing means supplies the plurality of computer hologram data groups to said rewritable spatial light modulation means on a group-by-group basis, so that the image frames as represented by the computer hologram data groups are supplied to said rewritable spatial light modulation means on a frame-by-frame basis;

wherein said rewritable spatial light modulation means produces and projects an image pattern on the subject material on a pattern-by-pattern basis for each computer hologram data group received from said electric processing means, so that a plurality of image patterns are projected in a series manner and are superposed and integrated at a substantially same location on the subject material to reproduce the original image pattern.

2. The optical device of claim 1 wherein said converting means includes Fourier transformation means for performing Fourier transformation on the plurality of data sets produced from said multiplying means to produce complex amplitude data, means for performing inverse tangent operation on the output of said Fourier transformation means and means for quantizing the output of said means for performing inverse tangent operation to produce the computer hologram data groups.

3. The optical device of claim 1 wherein each of the random phase distribution data groups includes a series of numbers comprising 1 and −1.

4. The optical device of claim 1 wherein electric processing means includes means for counting a number that represents the total number of dots that correspond to areas of the desired pattern to be reproduced, with the number of dots being used for controlling the emission intensity of said coherent light source.

5. The optical device of claim 1 wherein said spatial light modulation means includes liquid crystal spatial light modulation means.

6. The optical device of claim 5 wherein said liquid crystal spatial light modulation means is of a phase modulation type.

7. The optical device of claim 5 wherein said liquid crystal spatial light modulation means comprises two phase modulation type liquid crystal spatial light modulation means which are disposed such that their corresponding pixels oppose each other and their phase modulation orientations are perpendicular to each other.

8. The optical device of claim 1 wherein said electric processing means further includes means for storing a number that represents the total number of dots that correspond to areas of the desired pattern to be reproduced, with the total number of dots being used for controlling the emission intensity of said coherent light source.

9. The optical device of claim 6, further comprising a Fourier transform lens that receives and acts on the wavefront of the light emitted through said phase modulation type liquid crystal spatial light modulation means and reconstructs the original image pattern on the subject material.

10. The optical device of claim 6 wherein said phase modulation type liquid crystal spatial light modulation means is of a type capable of being driven by using an active matrix method and said spatial light modulation means has a same pixel pitch in both horizontal and vertical directions.

11. The optical device of claim 6 wherein said phase modulation type liquid crystal spatial light modulation means is of a type capable of being optically-written.

* * * * *